(12) United States Patent
He et al.

(10) Patent No.: US 9,757,675 B2
(45) Date of Patent: Sep. 12, 2017

(54) PARTIAL WALL-FLOW FILTER AND METHOD

(71) Applicant: CORNING INCORPORATED, Corning, NY (US)

(72) Inventors: Suhao He, Painted Post, NY (US); Achim Karl-Erich Heibel, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 14/162,121

(22) Filed: Jan. 23, 2014

(65) Prior Publication Data

US 2014/0208946 A1    Jul. 31, 2014

Related U.S. Application Data

(60) Provisional application No. 61/757,861, filed on Jan. 29, 2013.

(51) Int. Cl.
 *B01D 46/00* (2006.01)
 *B01D 46/24* (2006.01)
 *F01N 3/022* (2006.01)

(52) U.S. Cl.
 CPC ........ *B01D 46/2459* (2013.01); *B01D 46/247* (2013.01); *F01N 3/0222* (2013.01); *F01N 2330/06* (2013.01); *Y02T 10/20* (2013.01)

(58) Field of Classification Search
 CPC ............ B01D 46/2451; B01D 46/2429; F01N 3/0222; F01N 3/2828; F01D 2330/06
 See application file for complete search history.

(56) References Cited

U.S. PATENT DOCUMENTS

| | | | |
|---|---|---|---|
| 5,067,320 A | 11/1991 | Kanesaki | |
| 5,846,276 A * | 12/1998 | Nagai | B01D 46/0001 264/177.12 |
| 7,491,373 B2 * | 2/2009 | Ketcham et al. | 423/213.2 |
| 7,628,008 B2 | 12/2009 | Ranalli | |
| 8,444,752 B2 * | 5/2013 | Beall et al. | 95/273 |
| 8,673,064 B2 * | 3/2014 | Ahmed et al. | 95/273 |
| 9,006,138 B2 * | 4/2015 | Goto et al. | 502/439 |

(Continued)

FOREIGN PATENT DOCUMENTS

| | | |
|---|---|---|
| WO | 2006029808 A1 | 3/2006 |
| WO | 2009148498 A1 | 12/2009 |

OTHER PUBLICATIONS

English Translation of CN201410041881.1 Notice of First Office Action Dated April 6, 2017; 13 Pages, Chinese Patent Office.

*Primary Examiner* — Amber R Orlando
(74) *Attorney, Agent, or Firm* — Joseph M. Homa

(57) ABSTRACT

A partial wall-flow filter has an inlet end, an outlet end, and a plurality of parallel channels disposed and configured to flow fluid from the inlet end to the outlet end. The channels are defined by a plurality of porous walls. A first portion of the channels have a first hydraulic diameter $Dh1$, a second portion of the channels have a second hydraulic diameter $Dh2$ smaller than the first hydraulic diameter $Dh1$, and the ratio of $Dh1:Dh2$ is in the range of 1.1 to 1.6. At least a portion of channels having hydraulic diameter $Dh1$ are plugged at the outlet end, and channels having hydraulic diameter $Dh2$ are flow-through channels.

13 Claims, 7 Drawing Sheets

(56) References Cited

U.S. PATENT DOCUMENTS

| | | | |
|---|---|---|---|
| 2004/0161373 A1* | 8/2004 | Ichikawa et al. | 422/180 |
| 2005/0138908 A1* | 6/2005 | Kasai et al. | 55/523 |
| 2006/0057046 A1* | 3/2006 | Punke et al. | 423/215.5 |
| 2006/0185335 A1* | 8/2006 | Ichikawa | 55/523 |
| 2007/0048494 A1* | 3/2007 | Miyairi et al. | 428/116 |
| 2008/0120968 A1* | 5/2008 | Beall et al. | 60/295 |
| 2008/0233345 A1* | 9/2008 | Allen | 428/116 |
| 2008/0296236 A1* | 12/2008 | Gross et al. | 210/791 |
| 2009/0038294 A1* | 2/2009 | Anderson et al. | 60/295 |
| 2009/0049815 A1 | 2/2009 | Beall et al. | |
| 2010/0239478 A1* | 9/2010 | Arnold et al. | 423/213.2 |
| 2010/0303677 A1* | 12/2010 | Henry et al. | 422/171 |
| 2011/0132194 A1 | 6/2011 | Ahmed et al. | |
| 2011/0201493 A1* | 8/2011 | Goto et al. | 502/100 |
| 2012/0009092 A1* | 1/2012 | Mizutani et al. | 422/177 |
| 2012/0053814 A1* | 3/2012 | George et al. | 701/102 |
| 2012/0159938 A1* | 6/2012 | Fekety et al. | 60/311 |
| 2012/0240542 A1* | 9/2012 | Kikuchi | 55/523 |
| 2012/0247092 A1* | 10/2012 | Boorse | 60/301 |

* cited by examiner

PARTIAL WALL-FLOW FILTER AND METHOD

CROSS-REFERENCE TO RELATED APPLICATIONS

This application claims the benefit of priority under 35 U.S.C. §119 of U.S. Provisional Application Ser. No. 61/757,861 filed on Jan. 29, 2013 the content of which is relied upon and incorporated herein by reference in its entirety.

FIELD

The present disclosure relates generally to wall-flow filters used to filter exhaust gases, and more particularly to wall-flow filters having asymmetric channel sizes and having some plugged and some unplugged channels.

BACKGROUND

Exhaust gas aftertreatment systems for internal combustion engines may include, for example, a particulate filter (PF) for removing particulates from the exhaust gas stream, such as soot from diesel exhaust. The most widely used particulate filters are wall-flow filters. A conventional wall-flow filter includes a ceramic honeycomb body having longitudinal, generally parallel cell channels formed by a plurality of intersecting porous walls. The cell channels are typically plugged with a ceramic plugging cement to form a checkered pattern of plugs at the ends of the honeycomb body. The cell channels of the filter typically have some ends unplugged at an inlet end of the honeycomb body, referred to herein as "inlet channels." Likewise, typically, the cell channels also have the remaining ends plugged to form a checkered pattern of plugs at an outlet end of the honeycomb substrate with some ends unplugged, herein referred to as "outlet channels." In use, exhaust gas containing entrained soot particles enters into the (unplugged) inlet channels, flows through the porous walls (i.e., the wall-flow) and into the outlet channels, and exits through the (unplugged) outlet channels, wherein the porous walls retain a portion of the particles that were previously entrained in the exhaust gas.

In conventional wall flow filter designs, every channel is plugged at alternate ends. In this conventional design, exhaust gas enters open channels on the inlet end. The inlet channels are plugged at the outlet end, and so the gas is forced to travel through the porous wall into an adjacent channel which is open at the outlet end but plugged at the inlet end to exit the filter. Filtration of the particulate matter is accomplished as the gas is forced to pass through the porous wall. Filtration efficiencies greater than 90% have been realized with conventional wall-flow filters.

Conventional wall-flow filters may be cleaned to prevent the filter from becoming blocked and to maintain a suitable pressure drop across the filter below a prescribed limit. Increase in pressure drop across the filter generally results in an increase in backpressure against the engine which, if not controlled, may lead to undesirable power loss. One known method for cleaning the filter is to remove the soot trapped in the filter by thermal regeneration (hereinafter "regeneration"). The regeneration may be either "passive" or "active" or a combination thereof. In "passive" regeneration, the inlet temperature of the exhaust gas entering the filter is sufficiently high to itself initiate combustion of the soot trapped in the wall-flow filter on a generally continuous basis, once steady state engine operating conditions are met. In "active" regeneration, the location of the filter is such that the temperature of the filter is relatively low and additional energy input may be required to raise the temperature of the exhaust (and the filter) to a level that causes combustion of the soot trapped in the filter. Typically, the additional energy input is provided by post injection of fuel into the exhaust in combination with an oxidation catalyst located upstream of the filter.

Exhaust aftertreatment systems based on "active" regeneration have become the industry standard because they desirably operate at lower exhaust temperatures and assure suitable soot removal under different engine duty cycles by actively initiating regeneration. On the other hand, "active" regeneration comes with a fuel economy penalty. Further, conventional filters may exhibit relatively high back pressure. Accordingly, systems and filters which operate with fewer regeneration events during operation are desired, as are filters exhibiting lower backpressures.

SUMMARY

In one broad aspect, an asymmetric partial wall-flow filter is disclosed herein comprising an inlet end, an outlet end, and a plurality of parallel channels disposed and configured to flow fluid from the inlet end to the outlet end, the channels being defined by a plurality of porous walls. A first portion of the channels have a first hydraulic diameter $Dh1$, and a second portion of the channels have a second hydraulic diameter $Dh2$ smaller than the first hydraulic diameter $Dh1$, wherein the ratio of $Dh1:Dh2$ is in the range of 1.1 to 1.6. At least a portion of channels having hydraulic diameter $Dh1$ are plugged at the outlet end, and channels having hydraulic diameter $Dh2$ are flow-through channels. In one embodiment, all of the channels having hydraulic diameter $Dh1$ are plugged at the outlet end. In another embodiment, all of the channels having hydraulic diameter $Dh2$ re flow-through channels. In yet another embodiment, none of the channels are plugged at the inlet end. In yet another embodiment, all of the channels having hydraulic diameter $Dh1$ are plugged at the outlet end. In yet another embodiment, the partial wall flow filter has a length to diameter ratio between 0.9 and 1.5. In other embodiments, the partial wall-flow filter has at least one of t wall≤457 µm, MPD≤20 µm, and % P≥40%, and CD≥200 cpsi, wherein t wall is the transverse thickness of the porous walls, MPD is a mean pore diameter of the porous walls, % P is the total porosity of the porous walls, and CD is the cell density (per square inch) of the channels.

In another broad aspect, an asymmetric partial wall-flow filter is disclosed herein comprising an inlet end, an outlet end, and a plurality of parallel channels disposed and configured to flow fluid from the inlet end to the outlet end, the channels being defined by a plurality of porous walls. A first portion of the channels have a first hydraulic diameter $Dh1$, a second portion of the channels have a second hydraulic diameter $Dh2$ smaller than the first hydraulic diameter $Dh1$, and the ratio of $Dh1:Dh2$ is in the range of 1.1 to 1.6. None of the channels are plugged at the inlet end, and only channels having hydraulic diameter $Dh1$ are plugged at the outlet end. In one embodiment, all channels having hydraulic diameter $Dh1$ are plugged at the outlet end. In another embodiment, the number of plugged channels is selected to achieve a desired filtration efficiency. In yet another embodiment, the number of plugged channels is selected to achieve a desired pressure drop across the filter. In other embodiments, the partial wall-flow filter has a length to diameter ratio between 0.9 and 1.5. In yet other embodiments, the partial wall-flow filter has at least one of t wall≤457 μm, MPD≤20 μm, and % P≥40%, and CD≥200 cpsi, wherein t wall is the transverse thickness of the porous walls, MPD is a mean pore diameter of the porous walls, % P is the total porosity of the porous walls, and CD is the cell density (per square inch) of the channels.

In yet another broad aspect, a method of operating an exhaust system is disclosed, comprising providing a partial wall-flow filter having an inlet end, an outlet end, and a plurality of parallel channels disposed and configured to flow fluid from the inlet end to the outlet end, the channels being defined by a plurality of porous walls, wherein a first portion of the channels have a first hydraulic diameter Dh1, a second portion of the channels have a second hydraulic diameter Dh2 smaller than the first hydraulic diameter Dh1, wherein the ratio of Dh1:Dh2 is in the range of 1.1 to 1.6, channels having hydraulic diameter Dh1 are plugged at the outlet end, and channels having hydraulic diameter Dh2 are flow-through channels; and passing exhaust gas having particulate matter entrained therein through the partial wall-flow filter wherein some of the particulate matter is captured and some passes through the flow through channels.

Other features and advantages will be apparent from the following description and the appended claims.

BRIEF DESCRIPTION OF THE DRAWINGS

The accompanying drawings, described below, illustrate exemplary embodiments and are not to be considered limiting of the scope of the claims. The figures are not necessarily to scale, and certain features and certain view of the figures may be shown exaggerated in scale or in schematic in the interest of clarity and conciseness.

DETAILED DESCRIPTION

Figure 1A:
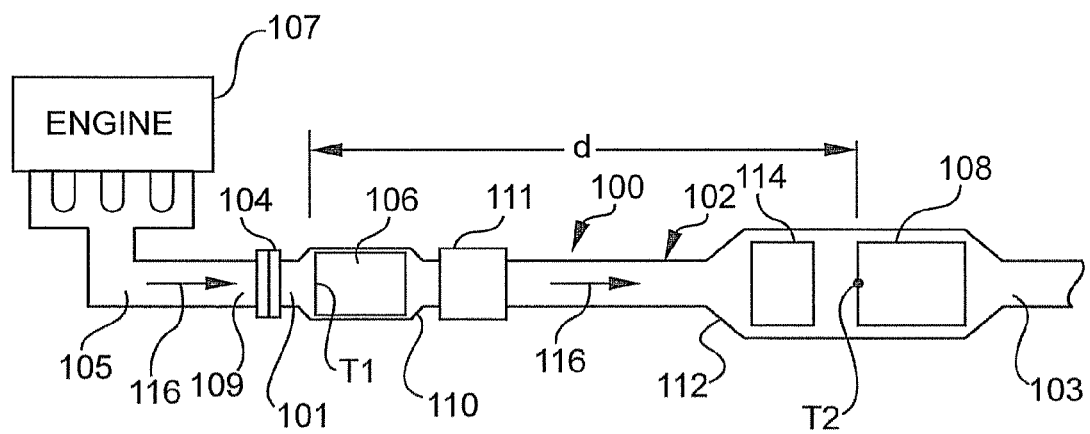
FIGS. 1A and 1B are schematic diagrams of diesel exhaust systems according to exemplary embodiments.

Example embodiments are illustrated in the accompanying drawings. In describing the example embodiments, numerous specific details are set forth to provide a thorough understanding of the embodiments. However, it will be apparent to one skilled in the art that some or all of these specific details are not required. In other instances, well-known features and/or process steps have not been described in detail so as not to unnecessarily obscure the embodiments. In addition, like or identical reference numerals are used to identify common or similar elements throughout the Figures.

FIG. 1A depicts an exhaust system 100 for venting exhaust from an exhaust manifold 105 of an internal combustion engine 107, such as a diesel engine or a gasoline engine. The exhaust system 100, as shown, includes an exhaust line 102 with inlet end 101 and outlet end 103. The inlet end 101 is coupled to the engine 107 through an exhaust manifold 105. The inlet end 101 may include a connection device 104, which may take on any suitable form. For example, the connection device 104 may be a flange that can be coupled to a similar flange on a connection portion 109 of the exhaust manifold 105. Although the exhaust line 102 is shown as being generally straight, in practice it may take on other profiles and may include straight and curved sections and/or sections of differing diameter.

Figure 1B:
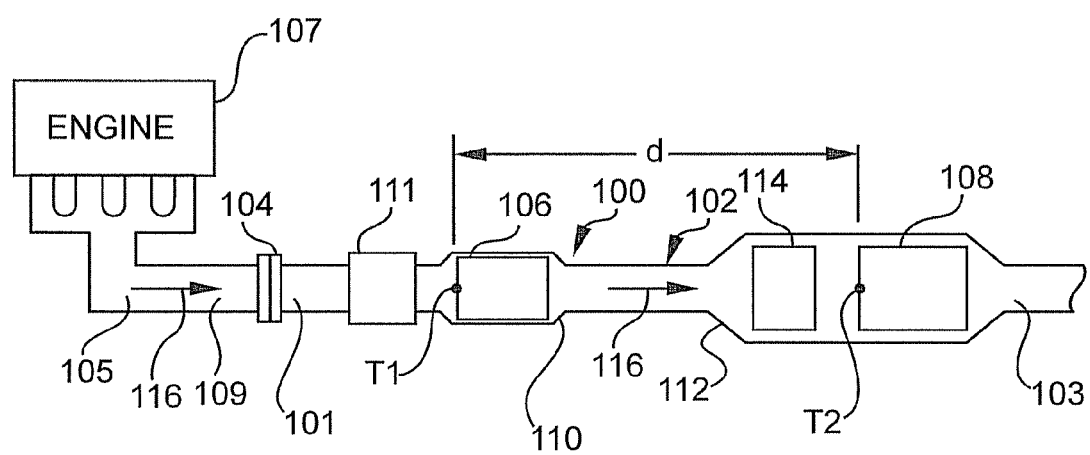

The exhaust system 100 includes a first particulate filter 106 disposed adjacent to the inlet end 101 of the exhaust line 102 such as partial wall-flow filter described herein. The first filter 106 may be in a "close-coupled" position with respect to the engine 107 and, of course, also the exhaust manifold 105. In this "close-coupled" position, the first particulate filter 106 may take advantage of the higher incident exhaust temperatures to effect a substantially greater extent of "passive" regeneration of the captured soot, as compared to a downstream (second) filter. The term "close-coupled" as used herein, means the filter is in a location in the exhaust stream in close proximity to the engine 107, and, in particular, in close proximity to the combustion chambers of the engine, as measured along the path of the exhaust stream. For example, "close-coupled" would be considered in close proximity of the engine 107, measured along the exhaust line, such that the inlet temperature ($T_1$) of the first filter 106, exceeds 250° C. for at least some portion of the operating cycle. Preferably, for at least 50% of the operation, the inlet temperature ($T_1$) of the first filter exceeds 200° C. In one example shown in FIG. 1A, a turbocharger 111 is positioned in the exhaust line 102 and the first particulate filter 106 is positioned upstream of the turbocharger 111 such that the hot gases directly impinge upon the first filter 106. In another embodiment, the first filter 106 is located directly downstream of the turbocharger 111 (See FIG. 1B). In the close-coupled position, the first filter 106 may experience temperature conditions of 250° C. or greater for a substantial amount, greater than 10%, or even greater than 20%, of the operating cycle. These conditions promote a substantial amount of "passive" regeneration. In some embodiments, to avoid unwanted damage to the filter, the inlet temperature $T_1$ should preferably not exceed about 400° C.

In some embodiments, the exhaust system 100 may further include a second particulate filter 108 positioned in the exhaust line 102, and spaced a distance (d) from the first particulate filter 106. In the examples shown in FIG. 1A, 1B, the second particulate filter 108 may be positioned downstream of a turbocharger 111. Additional particulate filters may be positioned in the exhaust line 102, downstream of the second particulate filter 108 to meet desired filtration and backpressure requirements. The second particulate filter 108 may be preceded by an upstream oxidation catalyst 114. In the example of a diesel engine 107, the oxidation catalyst would be a diesel oxidation catalyst (DOC), which may incorporate any known active catalytic species for purifying exhaust, such as catalytic species for oxidizing carbon monoxide, hydrocarbons, and soluble organic fraction of particulates, as is known in the art. If included, the oxidation catalyst 114 may be located between the first 106 and second 108 filters. The exhaust system 100 may further include devices such as diffusion and expansion cones 110, 112 at the inlet and outlet ends of the particulate filters 106, 108 to aid in achieving desired exhaust flow distribution in the particulate filters, and/or size and weight reductions in the exhaust line 102.

During normal operation of the engine 107, such as during the operation of a diesel engine, exhaust from the engine 107 and exhaust manifold 105 passes sequentially through the first particulate filter 106, turbocharger 111 (if present), oxidation catalyst 114 (if present), and second particulate filter 108, as indicated by arrows 116 in FIG. 1A. Particulates in the exhaust are trapped inside the first and second particulate filters 106, 108 as the exhaust passes through them. In particular, part of the soot is trapped in the first filter, while some of the remaining soot is trapped in the second filter. The engine operating conditions and location of the first filter 106 relative to the engine 107 may be set such that the inlet temperature $T_1$ of the exhaust at the first filter 106 is sufficient to itself initiate combustion of soot trapped in the first filter 106, i.e., to promote "passive" regeneration. Contrarily, the second filter 108 is spaced a distance (d) from the first filter 106 such that its inlet temperature $T_2$ is low in comparison to the inlet temperature $T_1$ of the first filter 106. In particular, the distance (d) is generally such that a ratio of inlet temperatures (T1/T2) is greater than or equal to 1.1, or even greater than or equal to 1.15. Preferably, the spacing of the filters is such that the temperature difference, $T_1-T_2$, is 20° C. or more, or even the difference is 25° C. or more.

According to some embodiments, the first particulate filter 106 may be a partial wall-flow filter. A partial wall-flow filter as defined herein is a particulate filter having porous walls forming channels wherein some of the channels are plugged and some of the channels are completely unplugged ("flow-through channels"). Such a partial wall-flow filter generally has a relatively low pressure drop in comparison to conventional filters wherein in the conventional case all the channels are plugged (e.g. at either the inlet end or the outlet end). According to some other embodiments, second particulate filter 108 is also a partial wall-flow filter. In some other embodiments, only one of the filters 106 and 108 is a partial wall-flow filter. In some other embodiments, only one of the filters 106 and 108 is used in exhaust system 100.

In one example, the first particulate filter 106 may be small enough to fit into the available space near the exhaust manifold 105, between the exhaust manifold 105 and the turbocharger 111, or just downstream of the turbocharger 111. The physical space (volume) needed to house the first particulate filter 106 may be relatively smaller than the space (volume) to house the second filter 108, because the second particulate filter 108 provides the additional volume needed to meet filtration requirements. In one implementation, the second particulate filter 108 may be a conventional wall-flow filter, for example. However, a conventional wall-flow filter would typically not be suitable for use as the first particulate filter 106 because of the size and pressure drop requirements for a filter in a "close-coupled" position. In particular, it is desirable that the first filter exhibit low pressure drop. Because of the low pressure drop requirement, the first particulate filter 106 may provide a lower filtration efficiency (i.e., capture a lower percentage of the particulates in the exhaust) as compared to the second particulate filter 108. As an example, the first particulate filter 106 may have an initial or "clean" filtration efficiency (FE @ 0 g/L) of less than about 80%. However, according to some embodiments, initial filtration efficiencies FE@ 0 g/L≥20% are achievable, or FE@ 0 g/L≥30%, FE@ 0 g/L≥40%, or even FE@ 0 g/L≥50%. As used herein, filtration efficiency (FE) is expressed as a percentage at a particular soot loading in the filter (i.e., grams of soot per liter of filter volume, or g/L). A "clean" filter will have a soot loading of zero (0) g/L.

In one broad aspect, a partial wall-flow filter as disclosed herein comprises a plurality of porous walls forming channels having asymmetric sizes, wherein some plugged channels and some unplugged flow-through channels are present. In one embodiment, adjacent channels are asymmetric in size and defined by hydraulic diameters Dh1 and Dh2, such that the ratio of Dh1 and Dh2 is between 1.1 and 1.6. In one embodiment, the channels are unplugged at the inlet end of the filter, and the larger channels (having hydraulic diameter Dh1) are plugged on the outlet end of the filter. In one embodiment, all of the larger channel are plugged at the outlet end. In another embodiment, less than all of the larger channels are plugged at the outlet end, such that some of the larger channels are flow-through channels. In one embodiment, the filter has a length to diameter ratio between 0.9 and 1.5. In some embodiments, the porous walls of the filter have a transverse thickness (t), where t≤457 µm. In some embodiments, the porous walls of the filter have a mean pore diameter (MPD), where MPD≤20 µm. In some embodiments, the porous walls of the filter have a total porosity (% P), where % P≥40%. In some embodiments, the channels of the filter have a cell density (CD), where CD≥200 cells per square inch (cpsi). In some embodiments, the filter has combinations of the above described wall thickness t, mean pore diameter MPD, total porosity % P, and/or cell density CD.

According to another aspect, a method of operating an exhaust system is provided, comprising providing a partial wall-flow filter having plurality of porous walls forming channels having asymmetric sizes, wherein some plugged channels and some unplugged flow-through channels are present. In one embodiment, adjacent channels are asymmetric in size and defined by hydraulic diameters Dh1 and Dh2, such that the ratio of Dh1 and Dh2 is between 1.1 and 1.6. In one embodiment, the channels are unplugged at the inlet end of the filter, and the larger channels (having hydraulic diameter Dh1) are plugged on the outlet end of the filter. In one embodiment, all of the larger channel are plugged at the outlet end. In another embodiment, less than all of the larger channels are plugged at the outlet end, such that some of the larger channels are flow-through channels. In one embodiment, the filter has a length to diameter ratio between 0.9 and 1.5. In some embodiments, the porous walls of the filter have a transverse thickness (t), where t≤457 µm. In some embodiments, the porous walls of the filter have a mean pore diameter (MPD), where MPD≤20 µm. In some embodiments, the porous walls of the filter have a total porosity (% P), where % P≥40%. In some embodiments, the channels of the filter have a cell density (CD), where CD≥200 cells per square inch (cpsi). In some embodiments, the filter has combinations of the above described wall thickness t, mean pore diameter MPD, total porosity % P, and/or cell density CD.

As described herein, partial filters with asymmetric channel sizes that are not plugged on the inlet end and have at least a portion of the large channels plugged on the outlet end result in filter performance that yields high filtration efficiency (for example, >50%) and low pressure drops at low soot loadings (that is, near 0 g/L), and low filtration efficiency (for example, <10%) at high soot loading levels (>5 g/L). The low filtration efficiency at high soot loadings ensures that the filter act as a bypass without damaging the after-treatment system with excessively high backpressure (which level depends upon the particular engine system) at high soot load levels. The slope of filtration efficiency (FE) vs. soot load can be further increased by having a filter where not all the large channels are blocked on the outlet end of the filter. The number of unplugged large channels is determined by the minimum filtration efficiency requirement at low soot load levels.

Further embodiments include a partial wall-flow filter having excellent properties for use in exhaust systems such as described above. It should be recognized that the partial wall-flow filter can be utilized in an exhaust system as the only exhaust treatment component in the system. For example, the system may include only a partial wall-flow filter, either being catalyzed or uncatalyzed. Optionally, the partial wall-flow filter may be used in combination with other conventional exhaust treatment components, and the partial wall flow filter is the only filter in the system. For example, oxidation catalyst (e.g., a DOC) or NOx treatment components may be employed in combination with the partial wall-flow filter. The partial wall-flow filter may be, for example, preceded by an upstream oxidation catalyst component. As discussed, a catalyst may be applied to the walls of the partial wall-flow filter, such as for treating carbon monoxide, hydrocarbons, and/or nitrogen oxides, such as a diesel oxidation catalyst or NOx catalyst. Suitable noble metals may be carried on the walls, such as platinum, rhodium, and palladium. Non-noble metals such as copper, titania, vanadium, zeolite, and perovskite catalyst may also be carried.

Figure 2A:
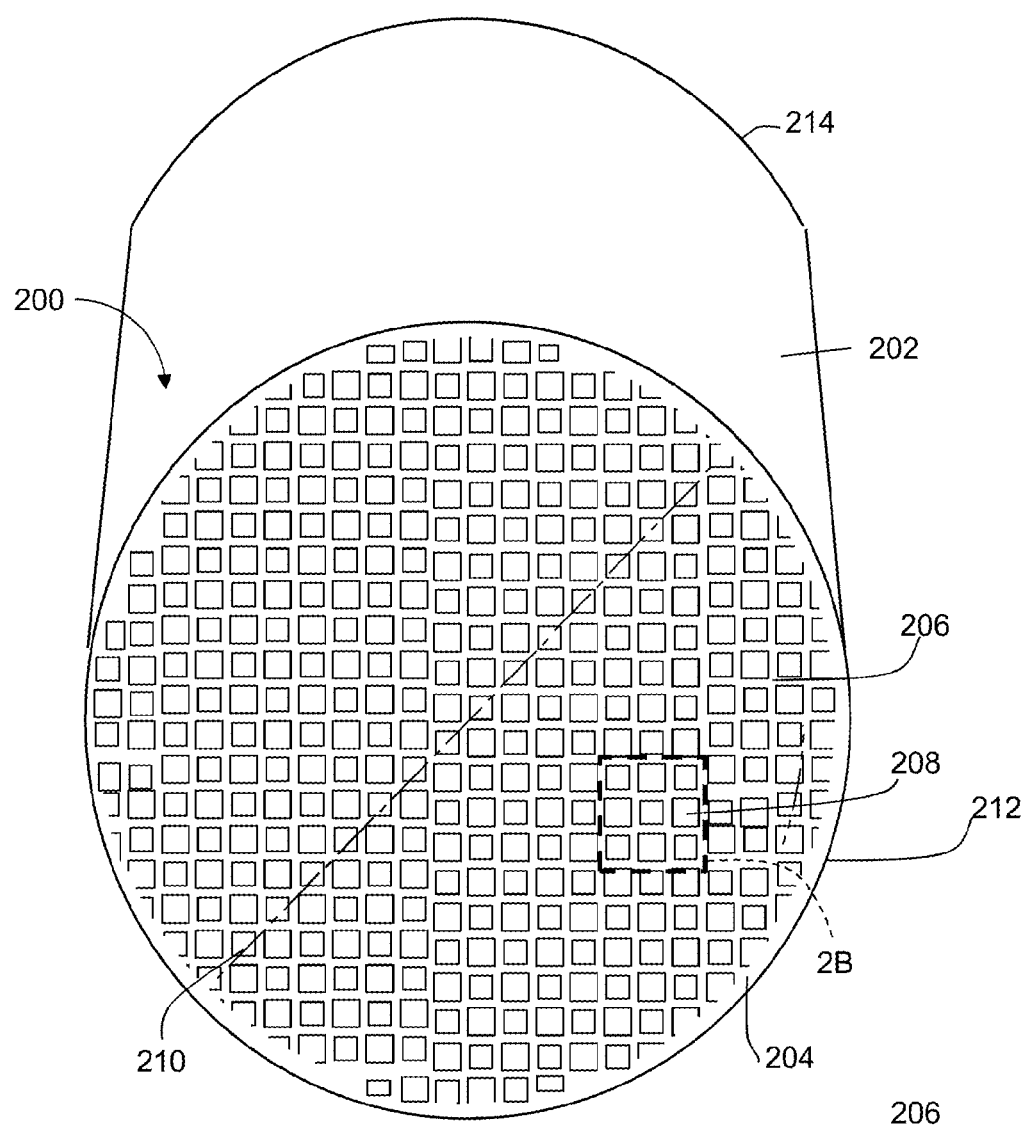
FIG. 2A is a perspective view of a partial wall-flow filter for use in the exhaust systems of FIGS. 1A and 1B.

Now describing a honeycomb partial wall-flow filter 200 having asymmetric channel sizes in more detail, an example embodiment is shown and described with reference to FIGS. 2A and 2B. FIG. 2A shows partial filter 200 has a columnar body 202 whose cross-sectional shape is defined by a skin (or peripheral wall) 204. The profile of the skin 204 is typically circular or elliptical, but embodiments are not limited to any particular skin profile. The columnar body 202 has an array of interconnecting porous walls 206, which intersect with the skin 204. The porous walls 206 define a grid of first channels 208 and second channels 210 in the columnar body 202. The first and second channels 208, 210 extend longitudinally along the length of the columnar body 202. First channels 208 have a first hydraulic diameter Dh1, and a second channels 210 having a second hydraulic diameter Dh2. In one embodiment, the ratio of Dh1 and Dh2 is between 1.1 and 1.6. Typically, the columnar body 202 is made by extrusion. Typically, the columnar body 202 is made of a ceramic material, such as cordierite, aluminum titanate, or silicon carbide, but could also be made of other extrudable materials, such as glass, glass-ceramics, and metal. The honeycomb filter 200 has an inlet end 212 for receiving flow, e.g., exhaust gas flow, and an outlet or exit end 214 through which filtered flow can exit the honeycomb filter.

The partial wall-flow filter 200 is so named because it exhibits a combination of plugged channels and unplugged flow-through channels. In the unplugged flow-through channels, flow is generally straight through the channel, i.e., not through the wall. In the plugged channels some of the flow passes through the walls. Thus, the "partial" indicates that only a part of the flow is through the porous wall, whereas part of the flow passes through the filter without flowing through a wall.

Figure 3:
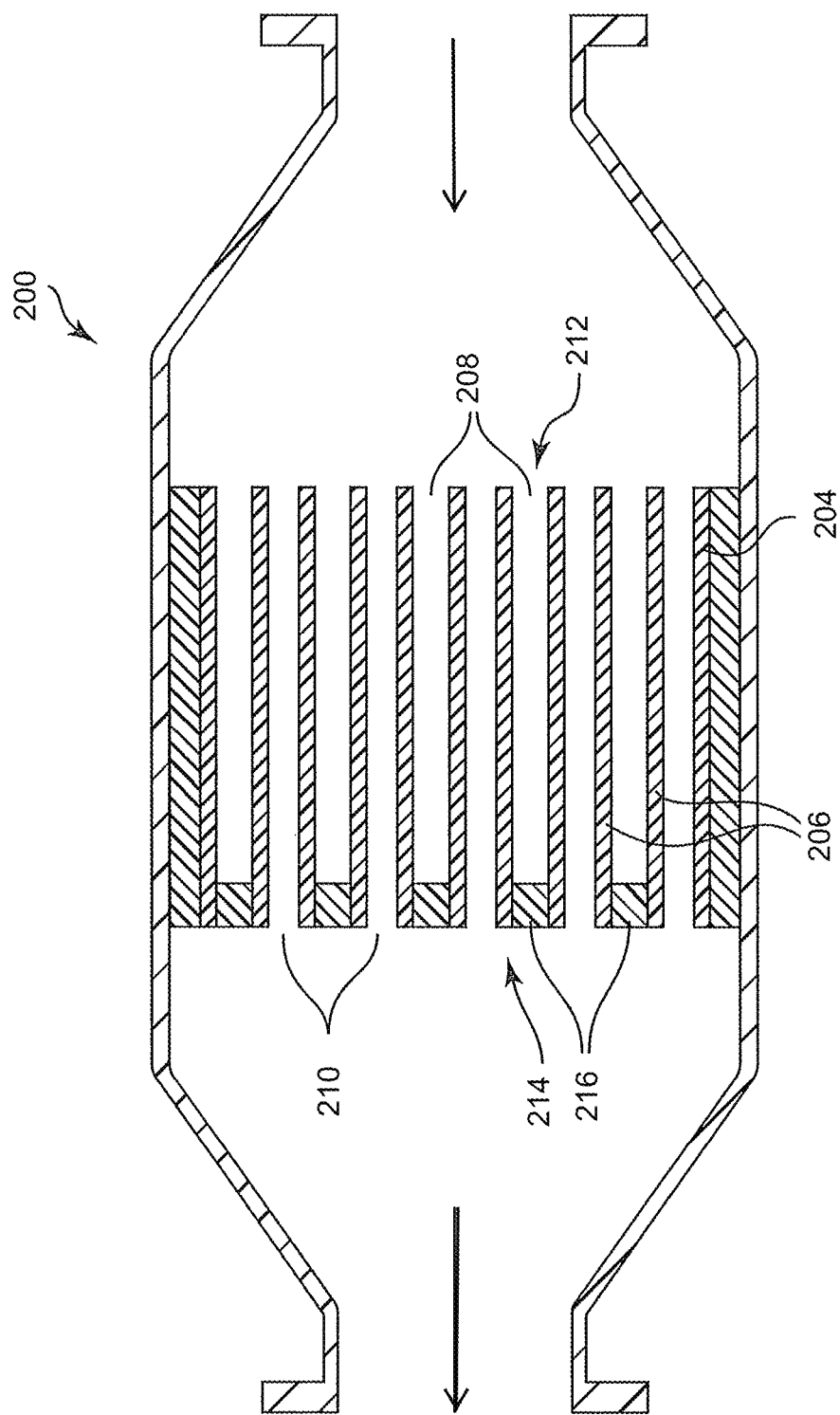
FIG. 3 is a cross-sectional illustration of a partial wall-flow filter according to exemplary embodiments, showing no channels plugged at the inlet end and large channels plugged at an exit end of the filter.
Figure 4:
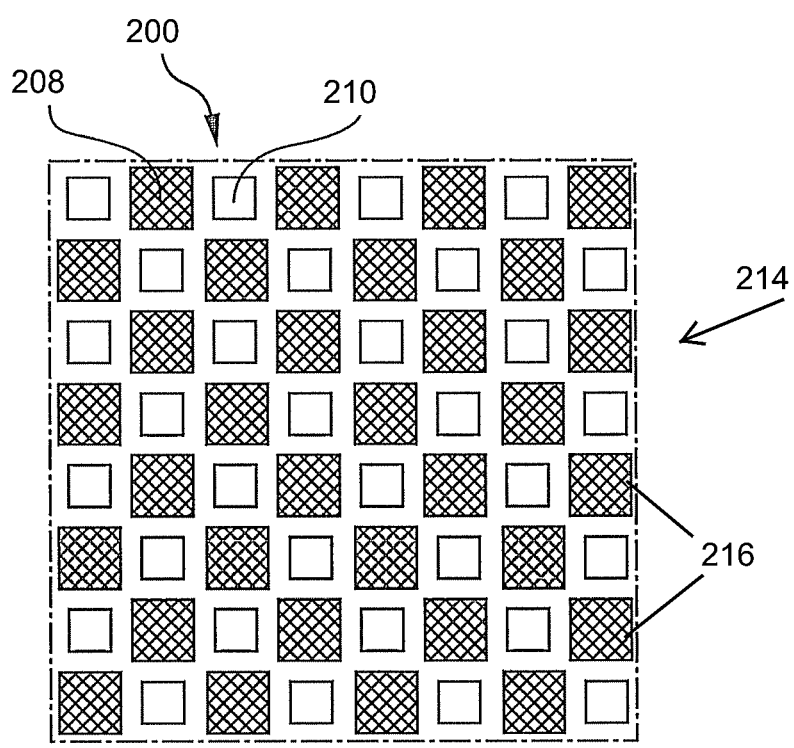
FIG. 4 is an enlarged portion of the exit end of the partial wall-flow filter of FIG. 2A, showing large channels plugged at the exit end of the filter.

In one embodiment, at least a portion of the first set of channels 208 are plugged channels, and the second set of channels 210 are unplugged flow-through channels. This differs from the conventional wall-flow filter where all the channels 208, 210 are all end-plugged (at either the inlet end 212 or the outlet end 214). The channels 208 are plugged adjacent to an outlet end 214 of the filter, that is, at or near the outlet end 214 (FIG. 3 and FIG. 4). Embodiments including this configuration and high wall porosity, greater than 45%, exhibit relatively minimal pressure drop as a function of soot loading. In some embodiments, plugs 216 may be provided at, for example, an outlet end 214 of the channels 208. In other embodiments, the plugs 216 may be provided at locations spaced in from the outlet end. Typically, the material of plugs 216 is made of a ceramic material, such as cordierite, aluminum titanate, or silicon carbide.

In some embodiments, plugs 216 may be provided at, for example, an outlet end 214 of less than all of the channels 208, leaving a portion of channels 208 open (unplugged) as flow-through channels. In some embodiments, the unplugged, flow-through channels 208, which are unplugged along their length, are evenly distributed among the plugged channels 208 across the face of the filter.

Figure 2B:
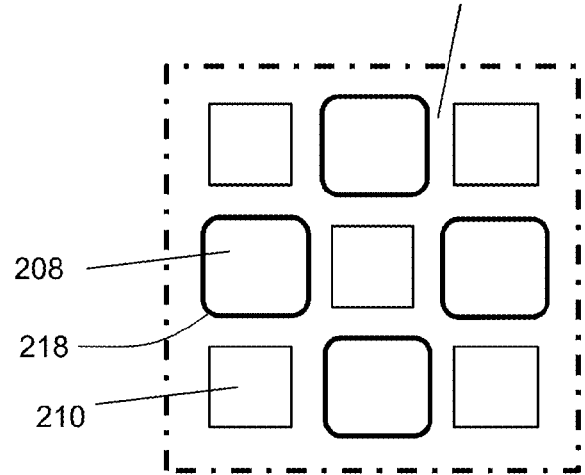
FIG. 2B is an enlarged portion of the inlet end of the partial wall-flow filter of FIG. 2A, showing all channels unplugged at the inlet end.

FIG. 2B shows a close-up view of the channel structure of the honeycomb filter 200. Each of the first channels 208 is bordered by second channels 210 and vice versa. The asymmetric honeycomb filter 200 is comprised of large and small channels 208, 210, respectively, having large and small hydraulic diameters. In the illustration, the channels 208, 210 have a generally square geometry. In some embodiments, corners of the channels may be provided with fillets or bevels. In one embodiment, the dimension of the fillets or bevels may be selected such that hydraulic diameter of the larger cells 208 is maximized for a selected cell density and closed frontal area.

Hydraulic diameter, $D_H$, of a cell is defined as follows:

$$D_H = \frac{4A}{P} \tag{1}$$

where A is the cross-sectional area of the cell and P is the wetted perimeter of the cell. For a square cell, the hydraulic diameter is the width of the cell. For a square cell with filleted corners, the hydraulic diameter is larger than the width of the cell.

A cross-sectional schematic illustration of partial wall-flow filter 200 according to this disclosure is shown and described with reference to FIG. 3. In FIG. 3 and FIG. 4, it is shown that the filter 200 includes plugged channels 208 and unplugged channels 210. The plugs 216 are all positioned at the outlet end 214 of the filter 200. In this embodiment, approximately 50% of the channels are plugged and the remainder comprise flow-through channels.

According to further embodiments of the partial wall-flow filter described herein, it has been discovered that combinations of good initial filtration efficiency (@ 0 g/L soot loading) and relatively low back pressure may be achieved. According to embodiments, the following features in partial wall-flow filter 200, when provided either singly, or in combination, have been found to yield desirable filter properties. A honeycomb filter having asymmetric channel sizes, where the hydraulic diameter ratio between larger and smaller channels is between 1.1 and 1.6, having no channels plugged on the inlet end and having all of the larger channels plugged at the outlet end, with a filter diameter to length ratio of 0.9 and 1.5, resulted in filter performance having low pressure drop and high filtration efficiency for low levels of soot loading (<1 g/L) and low filtration efficiency at high soot loading levels (>5 g/L). For example, it is possible to achieve higher deep bed filtration efficiency even when the filter total porosity (% P) is % P≥45%, or even % P≥60%. Thus, simultaneously relatively low back pressure and good deep bed filtration efficiency may be obtained. Increases in wall thickness (t) have been found to influence pressure drop significantly with only marginal effect on filtration efficiency. Thus, the transverse thickness (t wall) of the porous walls 206, may be t wall≤457 µm, t wall≤254 µm, or even t wall≤203 µm, while only marginally affecting back pressure. Also, increasing the mean pore diameter (MPD) of the porous walls 206 increases deep bed mode filtration efficiency while only slightly decreasing back pressure. Thus, the porous walls 206 may incorporate pores having a mean pore diameter (MPD) wherein MPD≤20 µm, or even MPD≤15 µm; in some embodiments 12 µm≤MPD≤30 µm. Additionally, deep bed filtration efficiency increases significantly with higher channel cell density (CD) with only a modest increase in back pressure. Accordingly, the partial wall-flow filter 200 may have a channel cell density (CD) wherein CD≥200 cpsi (CD≥30 cells/cm$^2$), or even CD≥300 cpsi (CD≥45 cells/cm$^2$).

The partial wall-flow filter 200 includes a porous honeycomb body 202 having, for example, a generally cylindrical shape. The transverse cross-section of the honeycomb body 202 may be circular, oval, elliptical, square, or may have other desirable shape. The honeycomb body 202 has inlet end face 212, outlet end face 214, and interior porous walls 206 extending between the inlet and outlet ends 212, 214. The channels 208, 210 may have a square cross-section or other type of cross-section, e.g., triangle, circle, octagon, rectangle, hexagon or combinations thereof. The honeycomb substrate 202 is preferably made of a porous ceramic material, such as cordierite, aluminum titanate, or silicate carbide or other like ceramic material particularly whose open interconnected porosity may be controlled.

In a partial wall-flow filter 200 having asymmetric channel sizes with plugs 216 on only one side (e.g., at exit end 214), partial filtration occurs by passage of exhaust through some of the walls 206, while some flow passes straight through the filter (i.e., not through a wall 206). When the plugs 216 are positioned adjacent to the outlet end 214 of the filter (as shown in FIG. 3), a pressure differential between plugged and unplugged flow-through channels results in transfer of exhaust from plugged channels to unplugged, flow-through channels, and soot may be accumulated in the plugged channels.

Filters with combinations of plugged channels and unplugged, flow-through channels where % P≥45%, and even % P≥60% have been found to be particularly effective as a first filter promoting high soot capture in the first filter and exhibiting low pressure drop.

In the partial wall-flow filters having asymmetric channel sizes as described herein, soot accumulates on the porous walls as exhaust passes through the filter. This accumulation of soot decreases the permeability of the walls and reduces exhaust flow to channels adjacent to the unplugged, flow-through channels 210. Thus, the ability of the partial wall-flow filter to capture soot decreases as soot is accumulated in the filter. One advantage of a filter which decreases in filtration efficiency is that a maximum soot load can be established for the filter and overloading of soot in the filter is less likely to occur in a partial wall-flow filter. In conventional wall-flow filters, filtration efficiency generally increases as soot load accumulation on the porous walls increases, making the filter more susceptible to soot overload. Soot overload is undesirable because maximum temperatures encountered in the filter during regeneration are generally directly proportional to soot load. The partial wall-flow filter of the embodiments has a built-in protection against high temperature excursions resulting from soot overload.

In one embodiment, the partial wall-flow filter with asymmetric channel sizes comprises a honeycomb body plugged at the outlet end 214 in a checkerboard pattern (alternately plugged and unplugged channels), with the large channels plugged at the outlet end 214 and all of the channels 208, 210 unplugged at the inlet end 212. In another embodiment, the partial wall-flow filter with asymmetric channel sizes comprises a honeycomb body plugged at the outlet end 214, with only a fraction of the large channels 208 plugged (e.g., less than all of the large channels 208 are plugged), and all of the channels 208, 210 are unplugged at the inlet end. The fraction of the large channels plugged is more than 20%, more preferably more than 60% and even more preferably more than 90% of the total number of large channels at the outlet end.

FIG. 4 shows a partial plugging pattern for a partial wall-flow filter 200 including unplugged, flow-through channels 210 and plugged channels 208, wherein the hydraulic diameters of the plugged and unplugged, flow-through channels are different. In particular, the hydraulic diameter of the plugged channels 208 are larger than the hydraulic diameter of the unplugged, flow-through channels 210. The plugged channels are located adjacent to the outlet end 214. In particular, an area ratio of the plugged area to open area of the filter is preferably 1.1 or more, 1.2 or more, or even 1.3 or more.

In Table 1, the effect of different plugging patterns on predicted pressure drop and filtration efficiency of a partial filter with asymmetric channels is shown. The comparison shows that desirable performance attributes are achieved for the case of filters having large channels plugged on the outlet end. In Case A of Table 1, the filtration efficiency and pressure drop performance of a conventional wall flow filter having asymmetric channels (e.g. where both inlet and outlet ends are plugged in checkered manner) is shown. In Case A, it is clear that there is significant increase in pressure drop with soot loading in the conventional (fully plugged) filter. For Case B, the small channels are plugged at the inlet end and no channels plugged at the outlet end. In Case B, while the pressure drop is low, the filtration efficiency is also low even for the case of low soot loading levels. For Case C, the large channels are plugged on the inlet side and no channels plugged on the outlet end. In Case C, the filtration efficiency is high, but the pressure drop is also high, making the configuration less attractive from an engine system application perspective. Similarly, in Case E, low filtration efficiency and low pressure drop is estimated when all channels are unplugged on the inlet end and small channels are plugged on the outlet end. The most attractive plugging configuration is described in Case D, where all channels are unplugged at the inlet end and large channels are plugged at the outlet end. The configuration of Case D results in high filtration efficiency and low pressure drop at low soot loading. The performance for the Case D plugging configuration at high soot loading levels is shown in Table 2 and FIG. 5 and it is observed that at high soot load levels, the filtration efficiency drops significantly for the filter to act as bypass and thereby reduces any damage to the filter at high soot loading levels.

Figure 5:
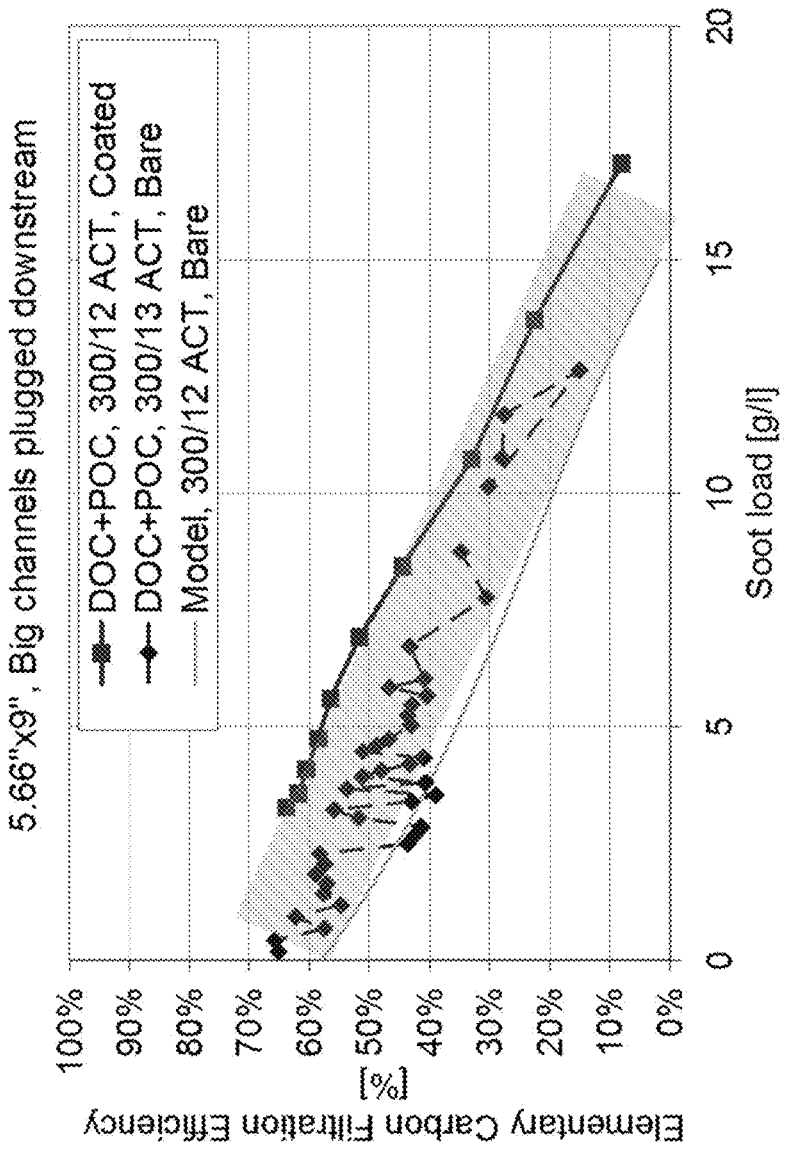
FIG. 5 is a plot of filtration efficiency as a function of soot load for a filter having asymmetric channels unplugged on the inlet end and having large channels plugged at the exit end.

FIG. 5 shows a plot of filtration efficiency as a function of soot load for a filter having asymmetric channels unplugged on the inlet end and having large channels plugged at the exit end. The Figure compares:

predicted filtration efficiency for a partial filter having a cell density of 300 cells/inch$^2$ and 12 mil wall thickness, with asymmetric channel sizes in an uncoated state (i.e., without any catalytic washcoat thereon), labeled "Model, 300/12 ACT, Bare";

measured filtration efficiency for a partial filter having a cell density of 300 cells/inch$^2$ and 12 mil wall thickness, with asymmetric channel sizes in a coated state (i.e., with catalytic washcoat thereon) used in conjunction with a diesel oxidation catalyst (DOC), labeled "DOC+POC, 300/12 ACT, Coated"; and measured filtration efficiency for a partial filter having a cell density of 300 cells/inch$^2$ and 13 mil wall thickness, with asymmetric channel sizes in an uncoated state (i.e., without any catalytic washcoat thereon) used in conjunction with a diesel oxidation catalyst (DOC), labeled "DOC+POC, 300/13 ACT, Bare."

TABLE 1

Predicted pressure drop and filtration efficiency comparison for asymmetric channel sizes having different plugging configurations.

CASE A:
Asymmetric channel sizes; all channels plugged in conventional full filter configuration

| Filter Length (in) | Ash Exposure (g) | Ash in plugged channels (g) | dp @ 0 g/L (kPa) | dp @ 2.5 g/L (kPa) | FE @ 0 g/L (kPa) | FE @ 2.5 g/L (kPa) |
|---|---|---|---|---|---|---|
| 5 | 0 | 0 | 4.33 | 6.88 | 100 | 100 |
| 5 | 50 | 50 | 4.97 | 8.71 | 100 | 100 |
| 5 | 100 | 100 | 6.25 | 12.29 | 100 | 100 |
| 7 | 0 | 0 | 5 | 6.91 | 100 | 100 |
| 7 | 50 | 50 | 6.23 | 7.75 | 100 | 100 |
| 7 | 100 | 100 | 6.28 | 9.09 | 100 | 100 |
| 9 | 0 | 0 | 5.73 | 7.26 | 100 | 100 |
| 9 | 50 | 50 | 5.89 | 7.75 | 100 | 100 |
| 9 | 100 | 100 | 6.13 | 8.45 | 100 | 100 |

CASE B:
Asymmetric channel sizes; all channels unplugged at the outlet end and small channels plugged on the inlet end

| Filter Length (in) | Ash Exposure (g) | Ash in flow-through channels (g) | dp @ 0 g/L (kPa) | dp @ 2.5 g/L (kPa) | FE @ 0 g/L (kPa) | FE @ 2.5 g/L (kPa) |
|---|---|---|---|---|---|---|
| 5 | 0 | 0 | 2.5 | 2.77 | 29.4 | 17.5 |
| 5 | 50 | 11 | 2.56 | 2.84 | 26.1 | 17.1 |
| 5 | 100 | 22 | 2.61 | 2.92 | 24 | 17 |
| 7 | 0 | 0 | 2.63 | 2.94 | 31.5 | 24.1 |
| 7 | 50 | 13.5 | 2.68 | 3.01 | 30.2 | 24 |
| 7 | 100 | 27 | 2.73 | 3.1 | 29.2 | 24.1 |
| 9 | 0 | 0 | 2.76 | 3.09 | 32.5 | 28.5 |
| 9 | 50 | 15 | 2.8 | 3.17 | 32.1 | 28.7 |
| 9 | 100 | 30 | 2.85 | 3.25 | 31.9 | 29.3 |

CASE C:
Asymmetric channel sizes; all channels unplugged at the outlet end and large channels plugged on the inlet end

| Filter Length (in) | Ash Exposure (g) | Ash in flow-through channels (g) | dp @ 0 g/L (kPa) | dp @ 2.5 g/L (kPa) | FE @ 0 g/L (kPa) | FE @ 2.5 g/L (kPa) |
|---|---|---|---|---|---|---|
| 5 | 0 | 0 | 2.2 | 3.5 | 52.6 | 32.3 |
| 5 | 50 | 21 | 2.6 | 4.4 | 42.4 | 33.5 |
| 5 | 100 | 42 | 3.2 | 6.1 | 39 | 37.1 |
| 7 | 0 | 0 | 2.4 | 3.8 | 55.7 | 42.4 |
| 7 | 50 | 24.5 | 2.8 | 4.7 | 50.7 | 43.3 |
| 7 | 100 | 49 | 3.3 | 6.1 | 48.4 | 45.6 |
| 9 | 0 | 0 | 2.6 | 4.2 | 57.4 | 48.6 |
| 9 | 50 | 26 | 2.97 | 4.9 | 54.7 | 49.4 |
| 9 | 100 | 52 | 3.4 | 6 | 53.4 | 50.8 |

CASE D:
Asymmetric channel sizes; all channels unplugged at the inlet end and large channels plugged on the outlet end

| Filter Length (in) | Ash Exposure (g) | Ash in flow-through channels (g) | dp @ 0 g/L (kPa) | dp @ 2.5 g/L (kPa) | FE @ 0 g/L (kPa) | FE @ 2.5 g/L (kPa) |
|---|---|---|---|---|---|---|
| 5 | 0 | 0 | 2.8 | 3.19 | 54 | 30 |
| 5 | 50 | 21 | 2.96 | 3.26 | 43 | 25 |
| 5 | 100 | 42 | 3.07 | 3.31 | 35 | 21 |
| 7 | 0 | 0 | 3.1 | 3.4 | 56 | 39 |
| 7 | 50 | 24 | 3.13 | 3.48 | 50 | 35 |
| 7 | 100 | 48 | 3.23 | 3.55 | 45 | 31 |
| 9 | 0 | 0 | 3.23 | 3.6 | 57 | 44 |
| 9 | 50 | 25.5 | 3.32 | 3.68 | 54 | 41 |
| 9 | 100 | 51 | 3.4 | 3.75 | 51 | 39 |

CASE E:
Asymmetric channel sizes; all channels unplugged at the inlet end and small channels plugged on the outlet end

| Filter Length (in) | Ash Exposure (g) | Ash in flow-through channels (g) | dp @ 0 g/L (kPa) | dp @ 2.5 g/L (kPa) | FE @ 0 g/L (kPa) | FE @ 2.5 g/L (kPa) |
|---|---|---|---|---|---|---|
| 5 | 0 | 0 | 1.9 | 2.24 | 28.2 | 8.3 |
| 5 | 50 | 9 | 1.95 | 2.25 | 21.6 | 7.1 |
| 5 | 100 | 18 | 1.97 | 2.257 | 17.2 | 6.1 |
| 7 | 0 | 0 | 2.04 | 2.4 | 30.8 | 12.2 |
| 7 | 50 | 10.5 | 2.07 | 2.41 | 26.4 | 10.9 |
| 7 | 100 | 21 | 2.1 | 2.42 | 22.9 | 9.6 |
| 9 | 0 | 0 | 2.17 | 2.54 | 32.1 | 15.2 |
| 9 | 50 | 12 | 2.19 | 2.56 | 28.9 | 13.8 |
| 9 | 100 | 24 | 2.22 | 2.57 | 26.1 | 12.4 |

For each of Cases A-E in Table 1:

Gas mass flow rate (kg/hour): 240

Exhaust Gas Temperature (max, ° C.): 450

Filter diameter (inches): 5.66

Filter Cell Density (cells/inch$^2$): 300

Channel Wall Thickness (mils): 12

Ratio of Dh1:Dh2: 1.3

TABLE 2

Predicted pressure drop and filtration efficiency performance for filters having asymmetric channel sizes up to soot load of 7 g/L unplugged at the inlet end and large channels plugged at the outlet end.

| Filter Length (in) | Ash Exposure (g) | Ash in flow-through channels (g) | dp @ 0 g/L (kPa) | dp @ 2 g/L (kPa) | dp @ 5 g/L (kPa) | dp @ 7 g/L (kPa) | FE @ 0 g/L (kPa) | FE @ 2 g/L (kPa) | FE @ 5 g/L (kPa) | dp @ 7 g/L (kPa) |
|---|---|---|---|---|---|---|---|---|---|---|
| 7 | 0 | 0 | 3.1 | 3.34 | 3.7 | 3.85 | 57 | 42 | 28 | 22 |
| 7 | 50 | 21 | 3.12 | 3.4 | 3.73 | 3.9 | 51.55 | 38.3 | 26 | 20 |
| 7 | 100 | 42 | 3.2 | 3.5 | 3.8 | 4 | 47 | 35 | 23 | 17.5 |
| 9 | 0 | 0 | 3.23 | 3.54 | 3.92 | 4.14 | 58 | 47 | 35 | 28 |
| 9 | 50 | 22.5 | 3.31 | 3.61 | 3.98 | 4.2 | 55 | 44.5 | 32.5 | 26 |
| 9 | 100 | 45 | 3.39 | 3.67 | 4.03 | 4.3 | 52 | 42 | 30 | 24 |

For each example in Table 2:
Gas mass flow rate (kg/hour): 240
Exhaust Gas Temperature (max, ° C.): 450
Filter diameter (inches): 5.66
Filter Cell Density (cells/inch$^2$): 300
Channel Wall Thickness (mils): 12
Ratio of Dh1:Dh2: 1.3

Figure 6:
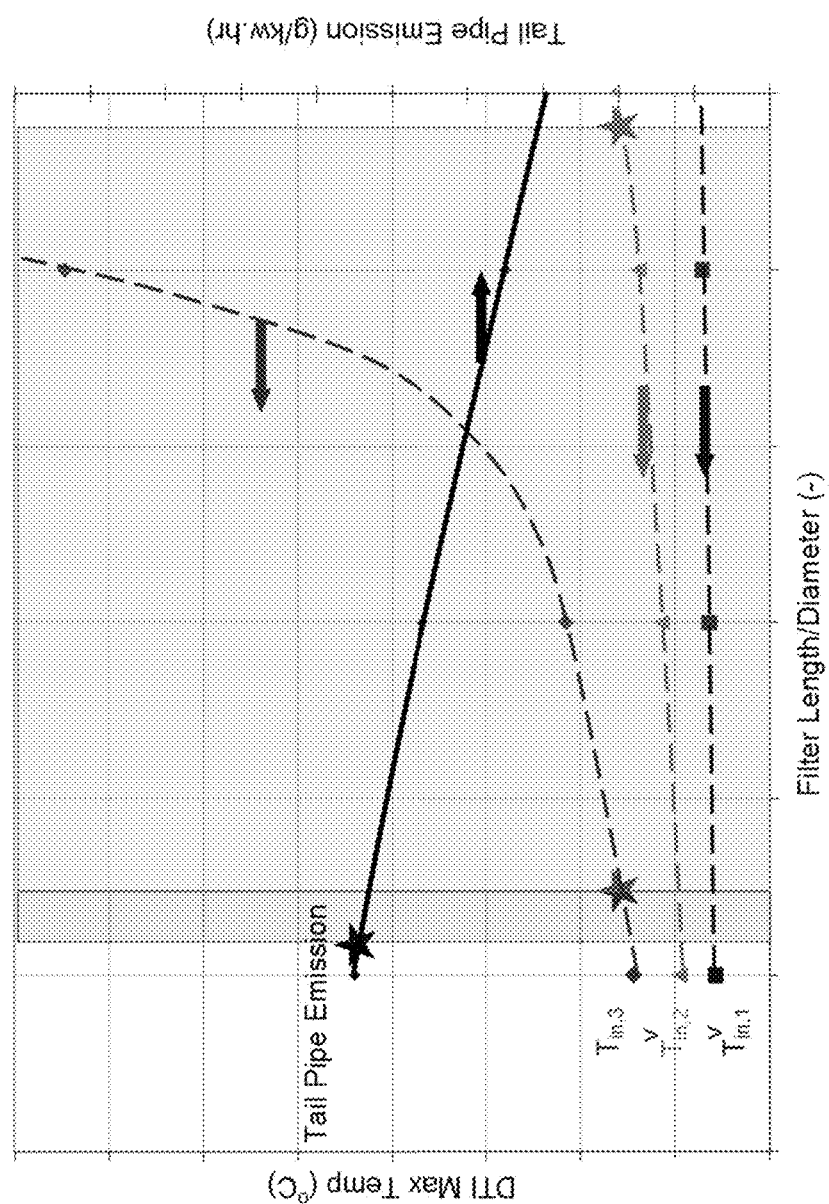
FIG. 6 is a plot of filtration efficiency as a function of soot load for filters having asymmetric channels unplugged on the inlet end and having large channels plugged at the exit end, where one filter has all large channels plugged and another filter has only a fraction of the large channels plugged.

As seen in the above Tables 1 and 2, having unplugged channels at the inlet end and large channels plugged at the outlet end results in the desirable combination of higher filtration efficiency and low pressure drop. As exemplified in FIG. 6, the fraction of the large channels that are plugged on the outlet side determines the soot load at which the filtration efficiency drops below 10% (for the filter to act as a bypass). In the example of FIG. 6, when all large channels are plugged at the outlet side, the example partial filter achieves a soot load of about 12 g/L before the filtration efficiency drops to 10%. However, when only a fraction of the large channels are plugged at the outlet side (i.e., some large channels are unplugged), the filter can be "tuned" such that filtration efficiency drops to 10% at a soot load of about 8 g/L. Depending upon the particular engine system and its associated characteristics (e.g. exhaust gas temperature, exhaust gas flow rate, sensitivity to backpressure, etc.), the fraction of unplugged large channels may be selected such that the partial filter begins acting as a bypass at a selected soot load. Therefore, in some embodiments of a partial filter with asymmetric channel sizes, no channels are plugged at the inlet end and all large channels are plugged at the outlet end. In other embodiments of a partial filter with asymmetric channel sizes, no channels are plugged at the inlet end and only a portion of the large channels plugged at the outlet end.

Filtration efficiency (FE) increases significantly with increasing cell density, with only a modest increase in pressure drop, particularly for a soot loaded filter. Therefore, a cell density of greater than 200 cpsi is preferred, more preferably greater than 250 cpsi, and most preferably greater than 300 cpsi.

Increases in wall thickness increase pressure drop significantly, with only a modest increase in filtration efficiency. Therefore, wall thicknesses less than 15 mils are preferred, more preferably less than 12 mils, and most preferably less than 10 mils.

Figure 7:
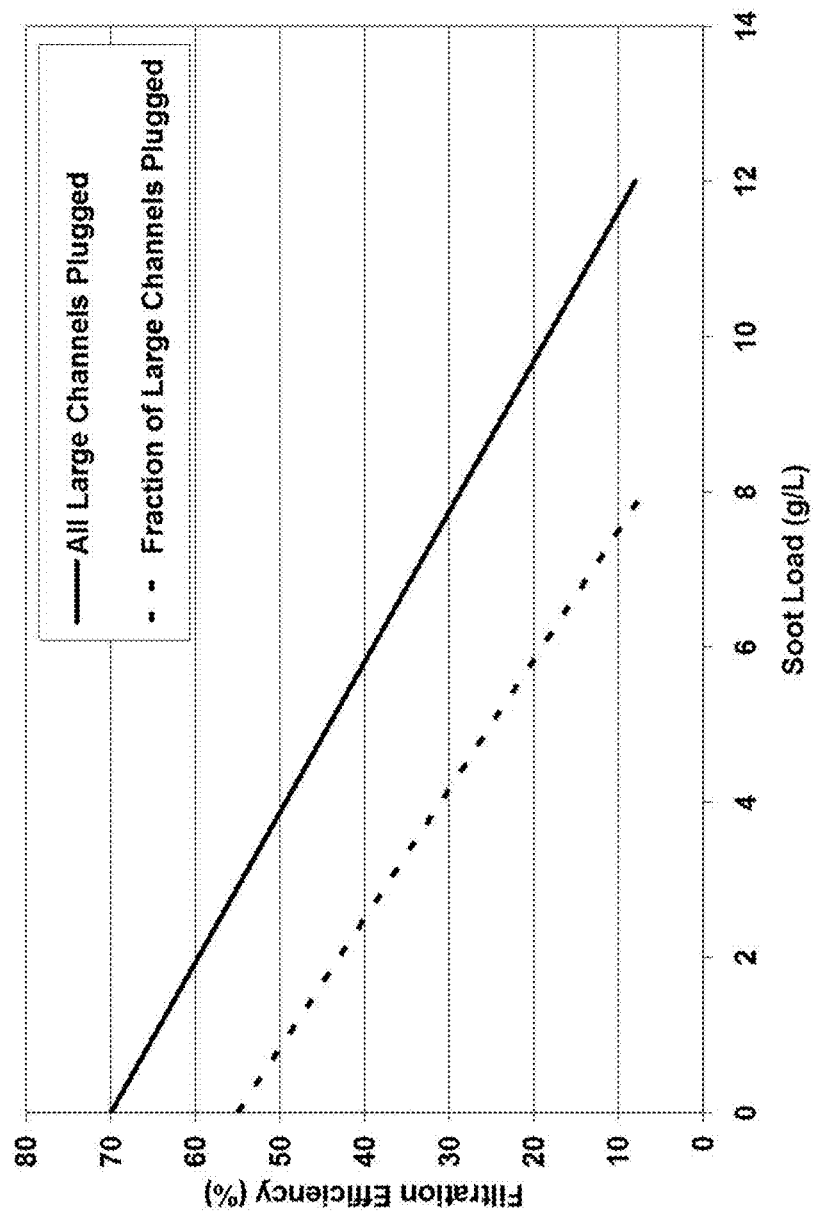
FIG. 7 is a schematic plot showing the relationship between maximum filter temperature during soot regeneration or burnout as a function of partial filter length.

The data in Tables 1 and 2 show that as the length of the filter increases, the filtration efficiency (FE) increases, with only a modest increase in pressure drop. Because of the increase in the filter volume with filter length, the total amount of soot in the filter can increase significantly. This can result in very high temperatures during a filter regeneration or during a drop-to-idle from rated power event, such that the filter experiences temperatures in excess of its operating capabilities, resulting in filter integrity failure. FIG. 7, illustrates that for sufficiently high filter inlet temperatures (Tin,3) and a sufficiently long filter, the maximum filter temperature can rapidly escalate during a regeneration event. Therefore, a filter length to diameter ratio of 0.9 to 1.5 is preferred, with a more preferable range of 1 to 1.35. Wall porosity with a mean pore size (MPS) of 10-30 µm is preferred, or even between 10-20 µm. Filtration efficiency (FE) and pressure drop both improve with higher porosity. Therefore, preferably porosity is greater than 40%, or even greater than 50%, or even greater than 60%.

While the disclosure describes a limited number of embodiments, those skilled in the art, having benefit of this disclosure, will appreciate that other embodiments can be devised which do not depart from the scope of the invention as claimed herein. Accordingly, the scope of the invention should be limited only by the attached claims.

What is claimed is:

1. A partial wall-flow filter, comprising:
   an inlet end, an outlet end, and a plurality of parallel channels disposed and configured to flow fluid from the inlet end to the outlet end, the channels being defined by a plurality of porous walls;
   wherein a first portion of the channels have a first hydraulic diameter Dh1, a second portion of the channels have a second hydraulic diameter Dh2 smaller than the first hydraulic diameter Dh1, and wherein the ratio of Dh1:Dh2 is in the range of 1.1 to 1.6;
   wherein the filter has a length L and a diameter D, and a length to diameter ratio L:D is between 0.9 and 1.5;
   wherein only a portion of channels having hydraulic diameter Dh1 are plugged at the outlet end, no channels are plugged at the inlet end, and channels having hydraulic diameter Dh2 are flow-through channels; and
   wherein the partial wall-flow filter has a filtration efficiency of >50% at soot loading levels of about 0 g/L, and has a filtration efficiency <10% at soot loading levels >about 5 g/L.

2. The partial wall-flow filter of claim 1, wherein more than 60% of the channels having hydraulic diameter Dh1 are plugged at the outlet end.

3. The partial wall-flow filter of claim 2, wherein more than 90% of the channels having hydraulic diameter Dh1 are plugged at the outlet end.

4. The partial wall-flow filter of claim 1, wherein all of the channels having hydraulic diameter Dh2 are flow-through channels.

5. The partial wall-flow filter of claim 1, wherein the filter has at least one of t wall <457 p.m, MPD<20 p.m, and % P>40%, and CD>200 cpsi, wherein t wall is the transverse thickness of the porous walls, MPD is a mean pore diameter of the porous walls, % P is the total porosity of the porous walls, and CD is the cell density (per square inch) of the channels.

6. A partial wall-flow filter, comprising:
an inlet end, an outlet end, and a plurality of parallel channels disposed and configured to flow fluid from the inlet end to the outlet end, the channels being defined by a plurality of porous walls;
wherein a first portion of the channels have a first hydraulic diameter Dh1, a second portion of the channels have a second hydraulic diameter Dh2 smaller than the first hydraulic diameter Dh1, and wherein the ratio of Dh1:Dh2 is in the range of 1.1 to 1.6;
wherein the filter has a length L and a diameter D, and a length to diameter ratio L:D is between 0.9 and 1.5;
wherein none of the channels are plugged at the inlet end, and only a portion of channels having hydraulic diameter Dh1 are plugged at the outlet end; and
wherein the partial wall-flow filter has a filtration efficiency of >50% at soot loading levels of about 0 g/L, and has a filtration efficiency <10% at soot loading levels >about 5 g/L.

7. The partial wall-flow filter of claim 6, wherein the number of plugged channels is selected to achieve a desired filtration efficiency.

8. The partial wall-flow filter of claim 6, wherein the number of plugged channels is selected to achieve a desired pressure drop across the filter.

9. The partial wall-flow filter of claim 6, wherein the filter has at least one of t wall <457 p.m, MPD<20 p.m, and % P>40%, and CD>200 cpsi, wherein t wall is the transverse thickness of the porous walls, MPD is a mean pore diameter of the porous walls, % P is the total porosity of the porous walls, and CD is the cell density (per square inch) of the channels.

10. A method of operating an exhaust system, comprising:
providing a partial wall-flow filter having an inlet end, an outlet end, and a plurality of parallel channels disposed and configured to flow fluid from the inlet end to the outlet end, the channels being defined by a plurality of porous walls, wherein a first portion of the channels have a first hydraulic diameter Dh1, a second portion of the channels have a second hydraulic diameter Dh2 smaller than the first hydraulic diameter Dh1, wherein the ratio of Dh1:Dh2 is in the range of 1.1 to 1.6, the filter has a length L and a diameter D, and a length to diameter ratio L:D is between 0.9 and 1.5; none of the channels are plugged at the inlet end, only a portion of channels having hydraulic diameter Dh1 are plugged at the outlet end, and channels having hydraulic diameter Dh2 are flow-through channels, wherein the partial wall-flow filter has a filtration efficiency of >50% at soot loading levels of about 0 g/L, and has a filtration efficiency <10% at soot loading levels >about 5 g/L; and
passing exhaust gas having particulate matter entrained therein through the partial wall-flow filter wherein some of the particulate matter is captured and some passes through the flow through channels.

11. The method of claim 10, wherein the partial wall-flow filter has at least one of t wall <457 p.m, MPD<20 p.m, and % P>40%, and CD>200 cpsi, wherein t wall is the transverse thickness of the porous walls, MPD is a mean pore diameter of the porous walls, % P is the total porosity of the porous walls, and CD is the cell density (per square inch) of the channels.

12. The method of claim 10, wherein more than 60% of the channels having hydraulic diameter Dh1 are plugged at the outlet end.

13. The method of claim 12, wherein more than 90% of the channels having hydraulic diameter Dh1 are plugged at the outlet end.

* * * * *